United States Patent [19]
Arnold

[11] 3,821,988
[45] July 2, 1974

[54] ROOT AND SOIL SEPARATING AND WINDROWING APPARATUS

[76] Inventor: Winfred A. Arnold, P.O. Box Drawer B, Three Rivers, Tex. 78071

[22] Filed: Apr. 10, 1972

[21] Appl. No.: 242,725

[52] U.S. Cl. ............... 171/133, 171/109, 56/322
[51] Int. Cl. ............................................ A01d 19/02
[58] Field of Search ........ 171/133, 61, 109; 56/322

[56] References Cited
UNITED STATES PATENTS

| | | | |
|---|---|---|---|
| 1,528,502 | 3/1925 | Murphy | 171/133 |
| 2,742,839 | 4/1956 | Davidson et al. | 171/109 |
| 2,827,755 | 3/1958 | Leinhauser | 56/322 |
| 3,627,051 | 12/1971 | Schmitz | 171/133 |

*Primary Examiner*—Antonio F. Guida
*Attorney, Agent, or Firm*—John C. Stahl; Wayland D. Keith

[57] ABSTRACT

A root and soil separator and root windrowing apparatus to be attached to a conventional root plow, which plow is pulled behind a tractor, so as the plow cuts the roots of trees and brush, the roots and soil will be directed onto a series of power driven, rotary beater blade elements, the circular paths of which beater blades pass between the paths of the blades on adjacent shafts, so as to separate the roots from the soil and move the roots rearwardly into a catcher element, which roots may be dumped from the catcher periodically, as in windrows, to enable the roots to be burned or to be hauled away. Provision is made to journal shafts in the frame of the root and soil separator at each end of each transverse, rotary beater blade, which shafts are connected in non-rigid, non-rotatable relation with respect to the transverse beater blade shaft. The root and soil separator is provided with an independent prime mover to rotate the transverse beater blade shafts.

11 Claims, 12 Drawing Figures

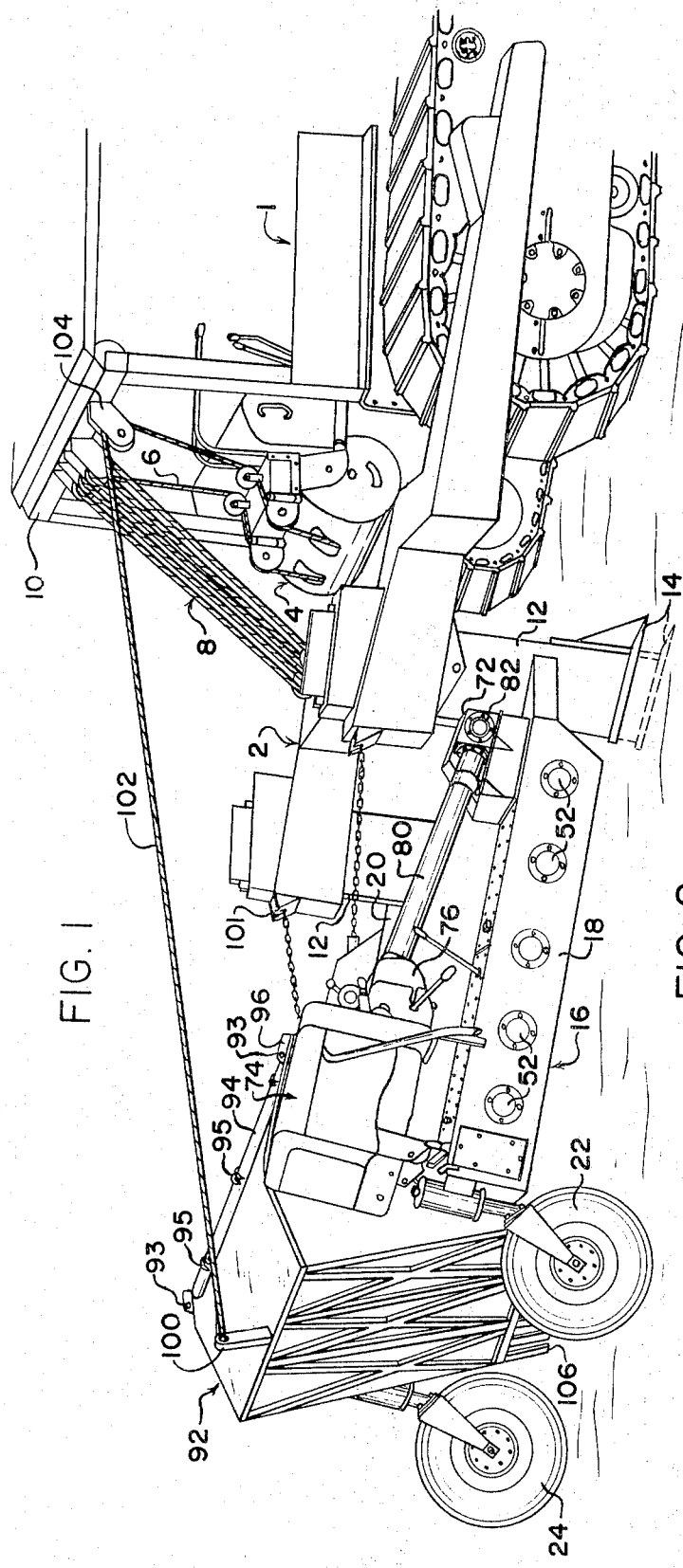
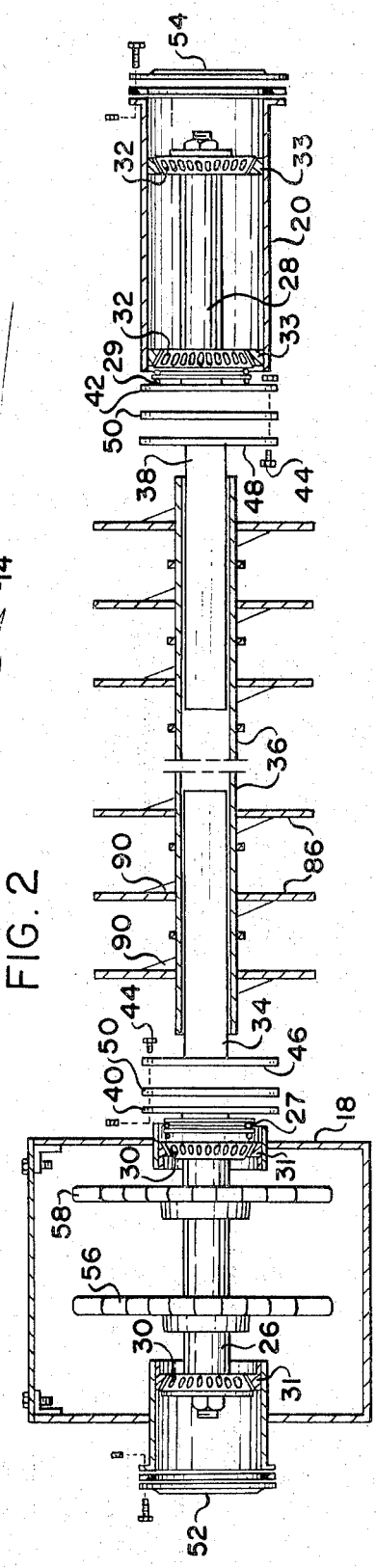
FIG. 1
FIG. 2

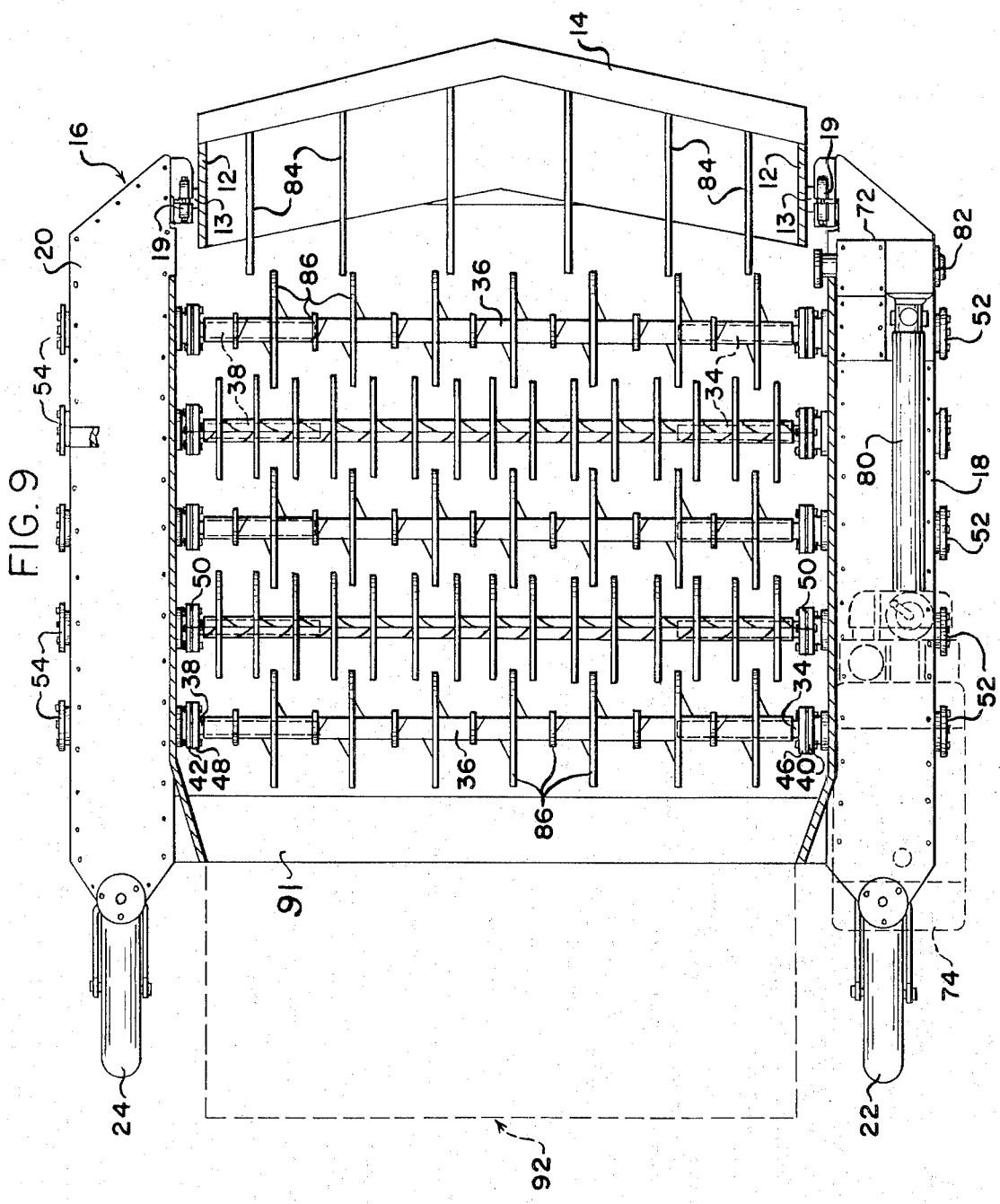

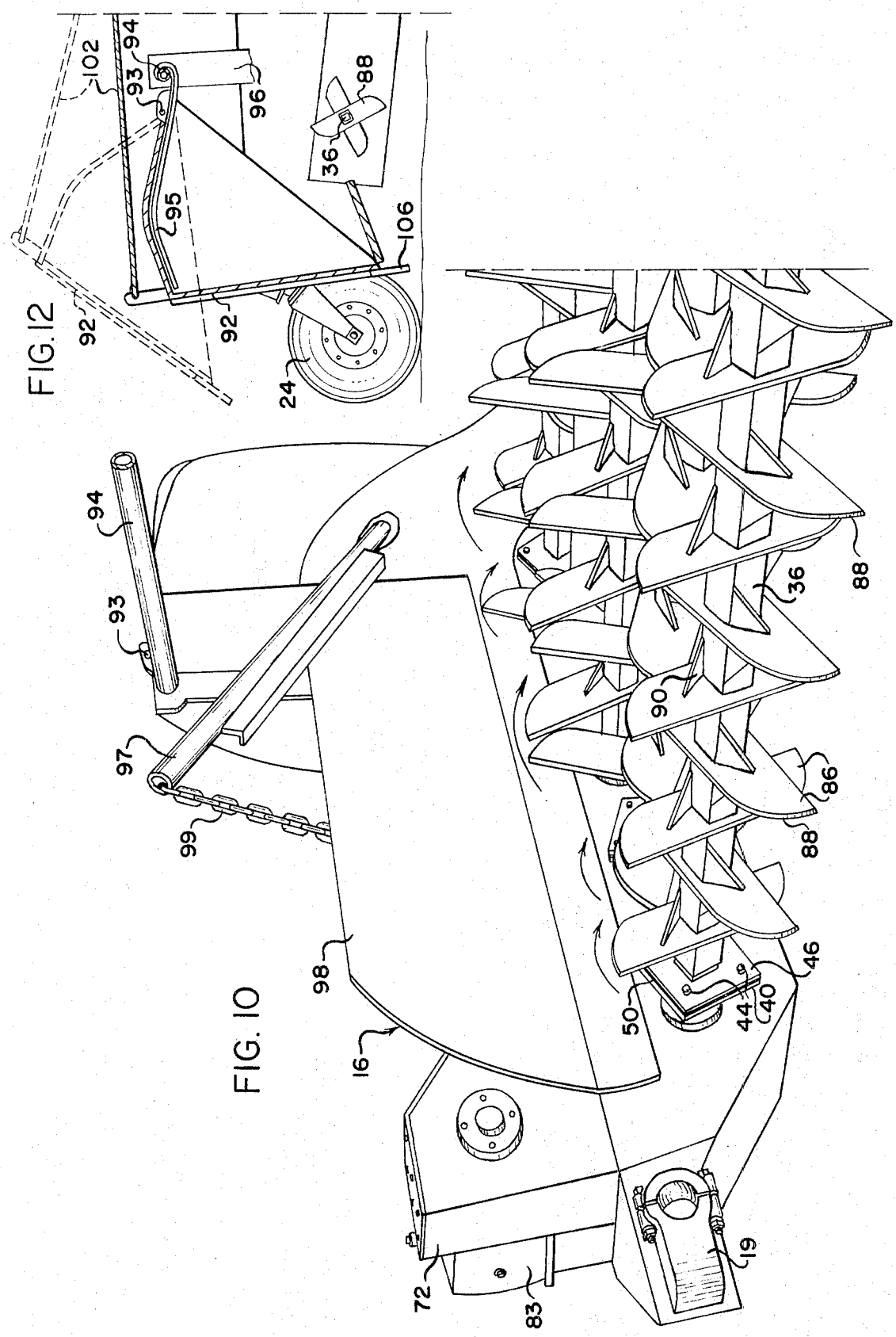

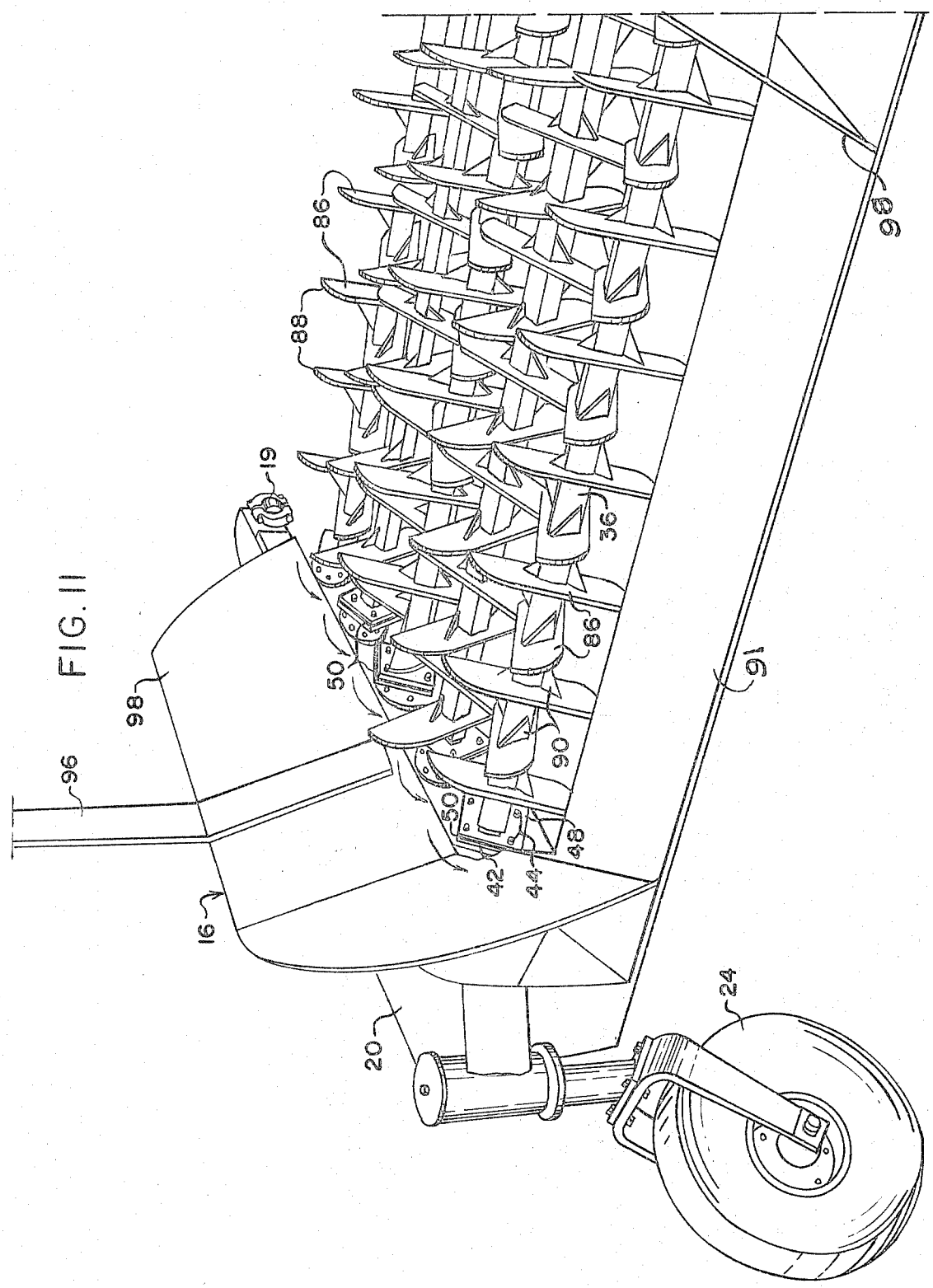

ROOT AND SOIL SEPARATING AND WINDROWING APPARATUS

This invention relates to a root and soil separating and windrowing apparatus to be attached to a root plow, which plow is pulled behind a prime mover, such as a tractor.

Root plows which are pulled behind tractors for plowing up the roots of trees and brush are old in the art, however, these for the most part, leave the roots exposed or partially exposed and the removal of such roots from the land being cleared presents a difficult problem, as the soil and rocks need to be removed from the roots before these are removed to a place of disposal. The removal of the soil and the like from the roots has heretofore been a difficult and time consuming process.

The present device is so constructed that it may be attached to the root plow, immediate rearward thereof, so that the roots, as they are plowed up, are elevated and directed onto the present root separating and windrowing apparatus. The root separating apparatus separates the soil, rocks and the like from the roots, which roots are then conveyed rearwardly to be deposited in a root catcher, which may be unloaded or dumped periodically. The roots may be dumped in rows to form windrows, thereby enabling the roots to be readily burned or hauled away to be otherwise disposed of.

The root separating device utilizes a series of beater elements thereon, the shafts of which are arranged in parallel relation, which shafts and beater elements are driven in the same direction by a power unit, to dislodge the soil and the like from the roots, and to convey the roots into a root catcher which is pivotally attached to the rear of the apparatus.

An object of this invention is to provide a root separator to separate the roots from soil and rocks as they are plowed from the ground.

Another object of the invention is to provide a separator for separating oil, rocks and the like from roots, which separator is attached to a root plow and separates the roots from the soil and the like as the roots are plowed up.

Still another object of the invention is to provide a root separator for separating roots from soil, rocks and the like which will direct the roots into a catcher where they are retained for a period of travel, then dumped into windrows, as desired.

Yet another object of the invention is to provide a root and soil separator which has removable shafts, which shafts may be removed and replaced without disassembly of the apparatus.

A further object of the invention is to provide a separator for separating the roots of trees, bushes and the like from the soil, the shafts of the apparatus being non-rigidly mounted to prevent breakage, because of misalignment.

Still a further object of the invention is to provide a root and soil separator which is relatively compact, easy to assemble and disassemble, simple in operation, and relatively low in the cost of construction, considering the magnitude of the results to be accomplished.

With these objects in mind and others which will become manifest as the description proceeds, reference is to be had to the accompanying drawings, in which like reference characters designate like parts in the several views thereof, in which:

FIG. 1 is a perspective view showing the top, a side and an end of a crawler-type tractor, which tractor has a root plow attached thereto, with the root and soil separator attached to the root plow, showing a root catcher pivotally mounted on the rear of the root and soil separator, and showing, in dashed outline, the root plow adjusted to cut deeper into the ground;

FIG. 2 is an exploded view taken transversely through the housing, approximately on the section 2—2 of FIG. 8, showing the bearing, sprocket and shaft arrangement, with the squared hollow shaft being broken away and shortened and being shown positioned about a squared shaft on which it is mounted;

FIG. 9 is a sectional view taken on the line 9—9 of FIG. 7, looking in the direction indicated by the arrows, but showing a root cutter blade attached thereto, with the root catcher being shown in dashed outline;

FIG. 10 is a fragmentary perspective view of the front portion of the root and soil separator, showing the ball joint connection member to which the root plow is connected and the tower shaft bevel gear housing of the drive mechanism; and FIG. 11 is a fragmentary view of the opposite end of the root and soil separator from that shown in FIG. 10, without the root catcher being attached thereto;

FIG. 12 is a fragmentary longitudinal sectional view of the rear portion of the root and soil separator, showing a root catcher attached thereto, the root catcher being shown in raised position in dashed outline.

Figure 3:
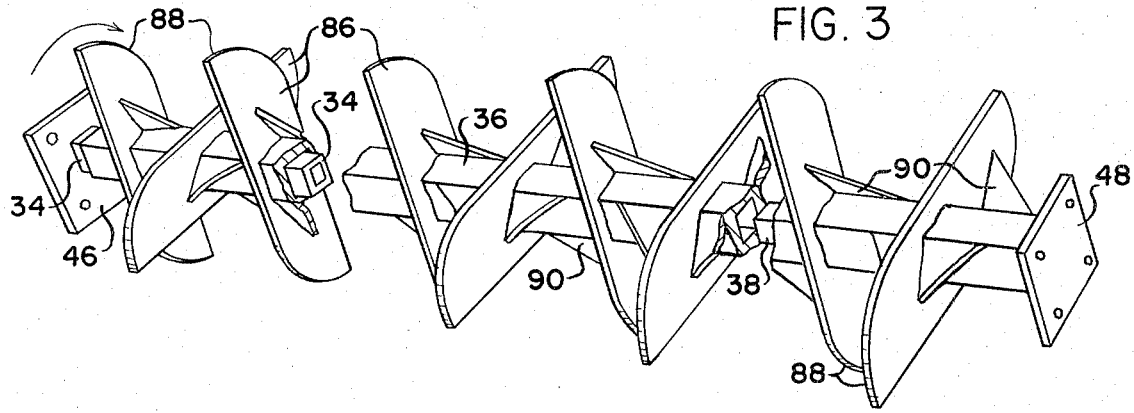
FIG. 3 is a perspective view of one of the root and soil separator shaft assemblies removed from the apparatus, with parts being broken away and shortened to show the details of construction and the bracing of the beater elements.

With more detailed reference to the drawing, the numeral 1 designates generally a tractor, which is shown to be of the crawler type, which tractor has a root plow, designated generally by the numeral 2, pivotally attached thereto for raising and lowering the root plow by means of a winch 4 which is mounted on the tractor. A winding cable 6 is attached to the winch and forms a block and tackle arrangement 8 between the overhead support member 10, on the tractor, and the root plow mechanism designated generally at 2. The root plow 2 has a shank 12 on each side thereof to which the blade 12 of the root plow is rigidly connected. The angularity and depth setting of root plows is well known in the art of root plows. The blade 14 is shown in dashed outline position, if a deeper setting of the plow is required. Since the root plow and the tractor are accessory to the present invention, the detailed operation thereof has been omitted for the sake of brevity.

The root and soil separator device is designated generally by the numeral 16 and has longitudinal side members 18 and 20. Each shank 12 of the plow has an outwardly extending ball member 13 secured thereto to engage with split, bolted socket connector member 19, one portion of which socket member is secured to the forward end of the respective side members 18 aNd 20 to enable the root separator 16 to be pivotally connected to the plow. The side member 18 has a caster wheel 22 pivoted on an upright axis at the rear end thereof, and the side member 20 has a caster wheel 24 pivotally mounted on the rear end thereof, which caster wheels are shown in FIGS. 1, 7, 8, 9 and 11 of the drawings. As will best be seen in FIG. 2, the side members 18 and 20, forming housings, journal the respective shafts 26 and 28 therein and have bearing seals 27 and 29 respectively therearound to retain lubricant therein. The anti-friction bearings, designated at 30 and 32 respectively have bearing races 31 and 33 respectively to journal the bearings in the respective housings. The shafts 26 and 28 are independently journaled in the respective housings and the shafts 34, 36 and 38, which extend there between, may be removed and replaced without disturbing the adjustment of the anti-friction bearings within the races in housings 18 and 20. The shafts 34 and 38 are preferably polygonal in shape to be received by a complementary, hollow polygonal shaft 36, such as a square shaft, so that the shaft 36 will have limited longitudinal sliding movement on shafts 34 and 38, when fitted in place, and will also be sufficiently loose on shafts 34 and 38 to be maintained against lateral binding action, should misalignment occur.

Figure 6:
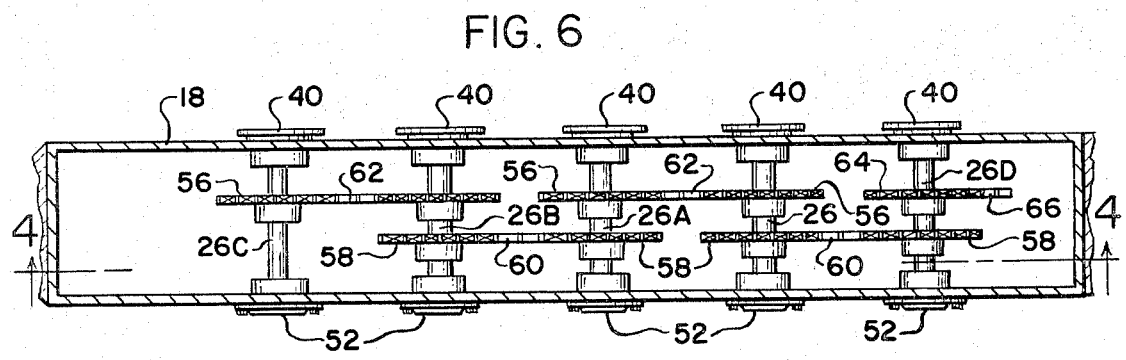
FIG. 6 is a sectional view taken on the line 6—6 of FIG. 4, looking in the direction indicated by the arrows; and showing the plan view of the drive arrangement of the sprockets which drive the beater shafts.

The shafts 26 and 28 have the respective flanges 40 and 42 thereon, as will best be seen in FIG. 2 and FIGS. 6 and 9, which flanges have bolt holes formed therein to receive bolts 44 therethrough and through the respective flanges 46 and 48 on the stub shafts 34 and 38 respectively to join the shafts 26, 34, 36, 38 and 28 in end to end relation, as the flanges 46 and 48 are complementary to the respective flanges 40 and 42.

It is preferable to have a yieldable element 50 intermediate the respective pairs of flanges, so as to enable a degree of alignment of the shafts 34 and 38 with respect to shaft 36. The housing 18 has bearing housings 52 therein to receive bearing races 31 to maintain the bearings 30 in aligned relation and to properly journal the shafts therein, as will best be seen in FIGS. 2 and 9. Likewise, the housing 20 has a bearing housing 54 therein to receive bearing races 33 to maintain the bearings 32 in aligned relation, so as to properly journal idler shafts 28 therein.

Figure 4:
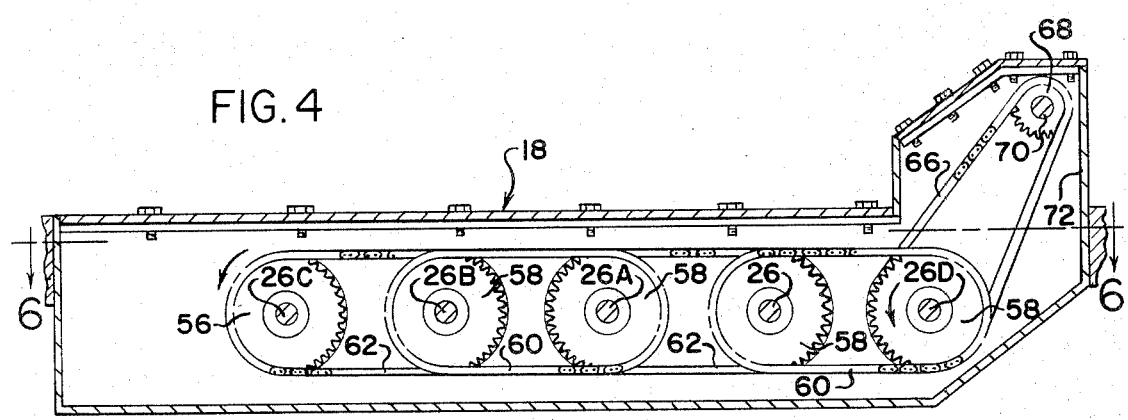
FIG. 4 is a longitudinal sectional view taken on the line 4—4 of FIG. 6, looking in the direction indicated by the arrows, and showing the drive arrangement of the root separator shafts.

The shaft 26 has sprockets 56 and 58 fixedly secured thereto for rotation therewith, which sprockets 56 and 58 drive chains 60 and 62 which drive similar sprockets on shafts 26A, 26B, 26C, so as to rotate the sprockets in the direction indicated by the arrows in FIG. 4. The sprockets 58 have chain 60 surrounding these sprockets and the sprockets 56 have chain 62 surrounding these sprockets.

Figure 5:
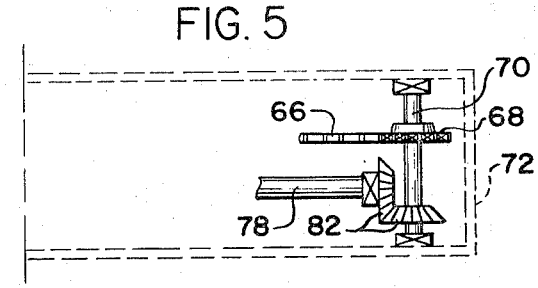
FIG. 5 is a diagrammatic view of the bevel gear drive arrangement for driving the root and soil separator shafts.
Figure 7:
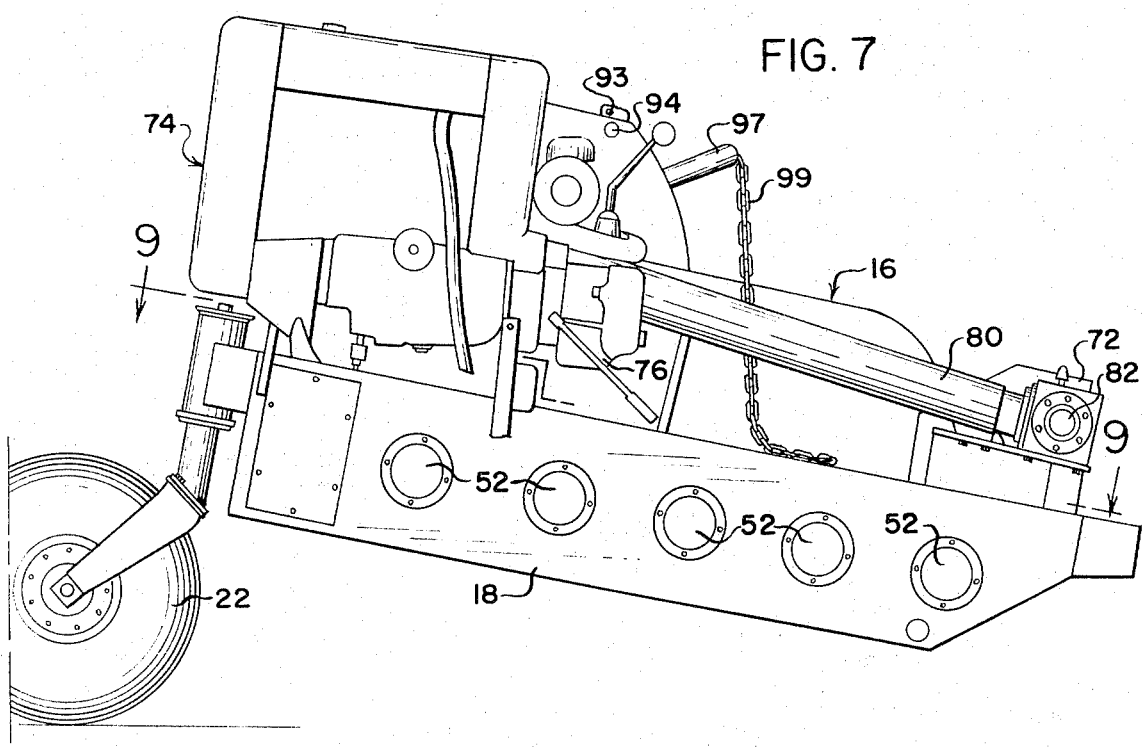
FIG. 7 is a side elevational view of the root and soil separator disconnected from the root plow, the root catcher not being shown, but showing the power unit and drive mechanism as connected in driving relation with the root and soil separator.
Figure 8:
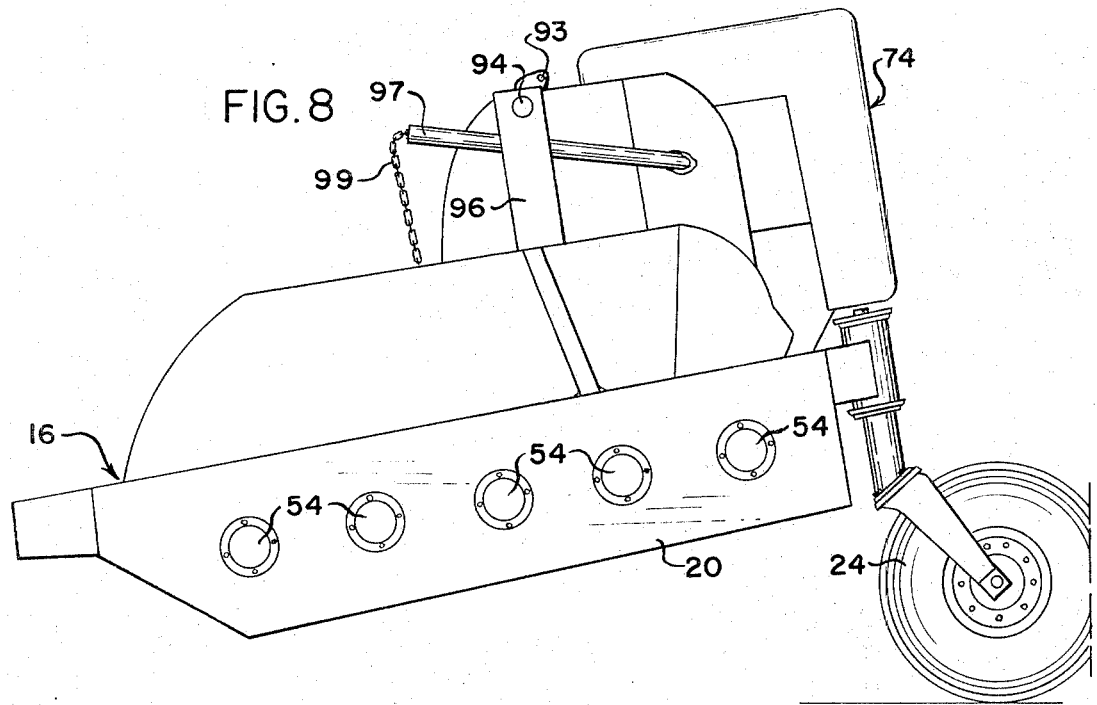
FIG. 8 is a view similar to FIG. 7 but of the opposite side of the apparatus.

The forward-most shaft 26D has a sprocket 64 thereon which is driven by chain 66 which surrounds sprocket 64 and sprocket 68, as will best be seen in FIGS. 4, 5 and 6. The sprocket 68 is mounted on a shaft 70, which shaft is journaled in tower shaft housing 72, as will best be seen in FIGS. 4 and 5, taken with exterior views, as shown in FIGS. 1 and 7, which show the housing.

An independent prime mover, designated generally by the numeral 74, mounted on housing 18, drives through clutch and transmission arrangement 76 and through a drive shaft 78 within drive shaft housing 80 to drive a right angle gear arrangement, such as bevel gears 82 to drive shaft 70, as will best be seen in FIGS. 4 and 5. The transmission-clutch arrangement 76 allows the driving of shafts 70, 26D, 26, 26A 26B and 26C at a selected speed to properly convey the roots, directed from the root plow blade 14 upwardly onto spaced apart bars 84 onto beater blades or elements 86 on shaft 36, as is particularly shown in FIGS. 3, 6, 9, 10 and 11. The beater blades or elements rotate in the direction indicated by the arrows in FIGS. 3, 10 and 11, with the rounded portion 88 of the beater blades 86 moving the roots rearward from the forward most shaft 26D to the rear most shaft 26C, with the intermediate shafts and beater blades tossing the roots and soil upwardly to dislodge the soil from the roots. The beater blades 86 are preferably positioned at a 90° arrangement, as shown in FIG. 3, with each alternate shaft being positioned at a 45° arrangement with respect to the adjacent shafts, so a continuous beating action is had on the roots, with sufficient speed and force to dislodge rocks and soil therefrom, which soil sifts down through the shafts and is returned to the terrain. Each of the beater blades 86 has a pair of braces 90 thereon, as will best be seen in FIG. 3, to rigidly secure the beater blades 86 to hollow shaft 36 and to the shafts which are connected in driving relation to shafts 26, 26A, 26B, 26C and 26D, as will best be seen in FIGS. 6 and 9.

Each beater blade 86 has a rounded portion 88 on the opposed ends thereof, so as the blade rotates in contact with the roots and soil, the roots will move rearwardly, with each rounded portion 88 of each beater blade 86 disengaging from the roots and moving the roots onto the next series of beater blades on shaft 36. The beater blades 86 of one shaft are off-set longitudinally approximately one-half the spacing between the beater blades of the adjacent shaft or shafts 36, and the beater blades on alternate shafts are on a 45° arcuate spacing with respect to the adjacent shaft or shafts. In this manner a continuous flow of roots thereover is had, without appreciable amounts of the roots falling downward between the shafts 36, which roots are deposited into a root catcher, designated generally at 92, which root catcher is pivotally mounted on the rear end of the root separator 16.

The root and soil separator 16 has forwardly extending tubular members 97 secured to the respective side plates 98, each which member 97 has a chain 99 secured thereto, as by welding, which chains extend forwardly to engage in a slotted anchor means 101 on the rear ends of the members of the root plow 2, so that upon lifting the root plow 2, with winch 4 and block and tackle arrangement 8, the root and soil separator 16, together with the root catcher 92 as well as the blade 14 will be lifted clear of the ground to allow movement from place to place over the terrain, without the root plow engaging the ground and without the root and oil separator being in operation.

ROOT CATCHER

Particularly as shown in FIGS. 1 and 12, the root catcher, designated generally at 92, is pivotally mounted on transverse axis 93 which is supported by upright supports 96 which are weldably secured to root retainer side plates 98, one on each side of the root and soil separator 16, as will best be seen in FIGS. 1, 10 and 11.

The root catcher 92 is of sufficient capacity to hold roots for a desired length of travel. The root catcher 92 has a lug 100 welded to the rear upper side thereof to which lug a winch cable 102 is connected. The winch cable 102 passes over a sheave arrangement 104 and is directed onto one of the dual winches 4, which winch is independently controlled to wind cable 102 thereonto and to permit cable to be payed out therefrom.

The root catcher 92, because of the weight thereof and the hinge arrangement to one side of the center of gravity, is self closing when the cable 102 is slackened, therefore, the roots accumulate in the catcher until sufficient in amount to be dumped. Whereupon, the cable 102 is tightened and the root catcher 92 pivots about axis 93 until it is raised a sufficient height to permit the roots to be discharged onto the terrain. The root catcher is preferably made of reinforced metal plates, as will best be seen in FIG. 1.

The roots may be dumped in such manner as to form rows, to enable a mechanical pick-up means to gather the roots to enable the land to be thoroughly cleared, or the roots may be burned, if desired.

Bar-like members 106 are secured to the lower side of the root catcher 92 and extend downwardly into close proximity to the surface of the terrain and form a rake-like member to rake loose roots that have not been picked up by the root and soil separator or which have otherwise become scattered over the terrain. Therefore, upon raising the root catcher 92 by means of the winch line 102, the roots are dumped from the root catcher 92 and the roots which have been raked up by the downwardly extending bars 106 will be simultaneously dumped along with the other roots.

The brace member 94 and the transverse plate 91 secure the housings 18 and 20 in rigid relation with respect to each other and when the root plow 2 is coupled to the forward end of the root and soil separator 16, the root and soil separator becomes a rigid unit.

Rearwardly extending bars 95 are secured to transverse, non-rotatable brace member 94 immediately below the cover of the root catcher 92, so upon upward movement of the root catcher 92 about transverse axis 93 to the position indicated in dashed outline in FIG. 12, The bars 95 will remain stationary, thereby to prevent the roots from moving upward so they will be discharged onto the terrain in piles or windrows, as desired.

What is claimed is:

1. In combination, a root plow adapted to be attached to a tractor and a soil and root separator apparatus, said apparatus comprising:
  a. a pair of spaced apart, longitudinal frame members,
    1. a rotatably mounted wheel on the rear end of each frame member to form a support therefor for movement over the terrain,
  b. connector members on the forward end of each said longitudinal frame member to pivotally connect each said frame member to said root plow,
  c. a plurality of transverse, rotatable shafts extending between said longitudinal frame members,
    1. beater blades secured to each said transverse, rotatable shaft at spaced intervals along the length thereof with the blades on each shaft being circumferentially spaced with respect to the adjacent blades,
    2. shafts journaled in said respective longitudinal frame members, transverse with respect thereto and each shaft having an end thereof extending inwardly of said longitudinal frame members and being in axially aligned relation with each said transverse shaft,
    3. connection means connected with each said transverse shaft and with said inwardly extending transverse shafts,
  d. said plurality of transverse shafts, having the beater blades thereon, being spaced longitudinally thereof so that the circumferential path of the beater blades of one shaft will pass between the circumferential paths of the beater blades of the adjacent shaft,
  e. said beater blades on one shaft being spaced out of circumferential phase with respect to the adjacent shaft,
  f. power means connected in driving relation with said shafts to rotate said beater blades to dislodge soil from the roots, which roots will be moved rearwardly, and
  g. a root catcher pivotally mounted on the rear end of said soil and root separator.

2. A soil and root separator apparatus as defined in claim 1; wherein
  a. said connector members on the forward end of each said longitudinal frame member is split and is adapted to complementally receive a ball therein,
  b. bolt means to secure said split connector members together to receive said ball therein in pivoted relation.

3. A soil and root separator apparatus as defined in claim 1; wherein
  a. said plurality of transverse shafts extending between said longitudinal frame members is each detachably connected to said transverse shafts journaled in said longitudinal frame members, and
  b. bolt means detachably connecting said shafts in end to end aligned relation.

4. A soil and root separator apparatus as defined in claim 1; wherein
  a. said plurality of transverse shafts, having the beater blades secured thereto, are of tubing, the opening in which tubing is polygonal,
  b. said shafts, journaled in said respective longitudinal frame members transversely with respect thereto, have an end thereof extending inwardly of said longitudinal frame members,
    1. an apertured first flange secured to the inner end of each inwardly extending shaft,
    2. a complementary second apertured flange detachably secured to each said first flange,
  c. polygonal shafts complementary to the polygonal opening in each said transverse shaft secured to each said second flange and extending inward into each end of each said transverse shaft so said polygonal shafts will rotate in unison with said transverse shafts,
1. said transverse, hollow, polygonal shaft having a limited longitudinal sliding movement with respect to said polygonal shafts, so upon rotation of each power driven, inwardly extending, polygonal shaft, each said transverse shaft will be rotated.

5. A soil and root separator apparatus as defined in claim 1; wherein
a. a prime mover is mounted on said soil and root separator,
b. transmission means attached to said transverse shafts, and
c. said prime mover being connected in driving relation with said transmission means to rotate said transverse shafts.

6. A soil and root separator apparatus as defined in claim 5; wherein
a. a right angle gear arrangement is mounted on shafts on one of said longitudinal frame members,
b. a drive shaft interconnecting said prime mover and a shaft of said right angle gear arrangement,
1. a sprocket mounted on the other shaft of said right angle gear arrangement,
2. said transmission means connected to said transverse shafts being sprockets connected in driving relation with each said shaft,
3. a further sprocket connected to one of said transverse shafts,
4. a chain surrounding said further sprocket and said sprocket on said right angle gear arrangement, and
5. a further chain interconnecting said sprockets connected to said transverse shafts, to drive all said transverse shafts in the same direction.

7. A soil and root separator apparatus as defined in claim 1; wherein
a. an upwardly extending shield is mounted on each said longitudinal frame member to retain the roots on said plurality of transverse shafts,
b. upright brace members secured to said each upright shield and extending upwardly thereabove,
c. a transverse brace member secured to said upright brace members near the upper ends thereof and extending therebetween,
d. said root catcher, having sheet metal sides and bottom, pivotally mounted on said upright members near the upper ends thereof and having the center of gravity thereof to the rear of said pivot point so the lower end of said root catcher will normally close the discharge end of said root and soil separator by gravity, and
e. a pull line connected to the rear top portion of said root catcher and extending forwardly, so upon pulling said line, the root catcher will be raised to dump roots therefrom.

8. A soil and root separator as defined in claim 7; wherein
a. said root catcher has bars extending downwardly from the lower end thereof so as to be in close proximity to the terrain, so as to rake roots therealong, not otherwise directed into said separator.

9. A soil and root separator apparatus as defined in claim 8; wherein
a. a further prime mover is provided,
b. a winch is mounted on said further prime mover and is connected in power driven relation therewith,
1. said pull line being attached to said winch of said further prime mover for raising and lowering said root catcher by said winch.

10. In combination, a root plow adapted to be attached to a tractor and a soil and root separating apparatus for attachment to said root plow, said apparatus comprising:
a. a pair of spaced apart, longitudinal frame members,
1. a pair of rotatably mounted wheels on the rear end of said frame members to form a support therefor for movement over the terrain,
b. connector members on the forward end of each said longitudinal frame member to pivotally connect each said frame member to said root plow,
c. a plurality of transverse shafts extending between and rotatably mounted on said longitudinal frame members,
1. beater elements secured to each said transverse, rotatable shaft, at spaced intervals, for rotation of said beater elements above the terrain,
d. said plurality of transverse shafts having the beater elements thereon so spaced as to direct roots upwardly and rearwardly along the upper side of the circumferential path described by the beater elements to direct roots off of the upper-most beater elements,
e. power means connected in driving relation with said shafts to rotate said beater elements to dislodge soil from the roots as the roots are moved upwardly and rearwardly, and
f. a root catcher pivotally mounted on the rear end of said soil and root separator.

11. A soil and root separating apparatus as defined in claim 10; wherein
a. an upwardly extending shield is mounted on each said longitudinal frame member to retain the roots on said plurality of transverse shafts,
b. upright brace members secured to each said upright shield and extending upwardly thereabove,
c. a transverse brace member secured to said upright brace members near the upper ends thereof and extending therebetween,
d. a root catcher, having metal sides and bottom, pivotally mounted on said upright members near the upper ends thereof and having the center of gravity thereof to the rear of said pivot point so the lower end of said root catcher will normally close the discharge end of said root and soil separator by gravity, and
e. a pull line connected to the rear top portion of said root catcher and extending forwardly, so upon pulling said line, the root catcher will be raised to dump the roots therefrom.

* * * * *